May 5, 1925. 1,536,758
C. BODMER
HAND DRILL OR THE LIKE
Filed Sept. 13, 1923
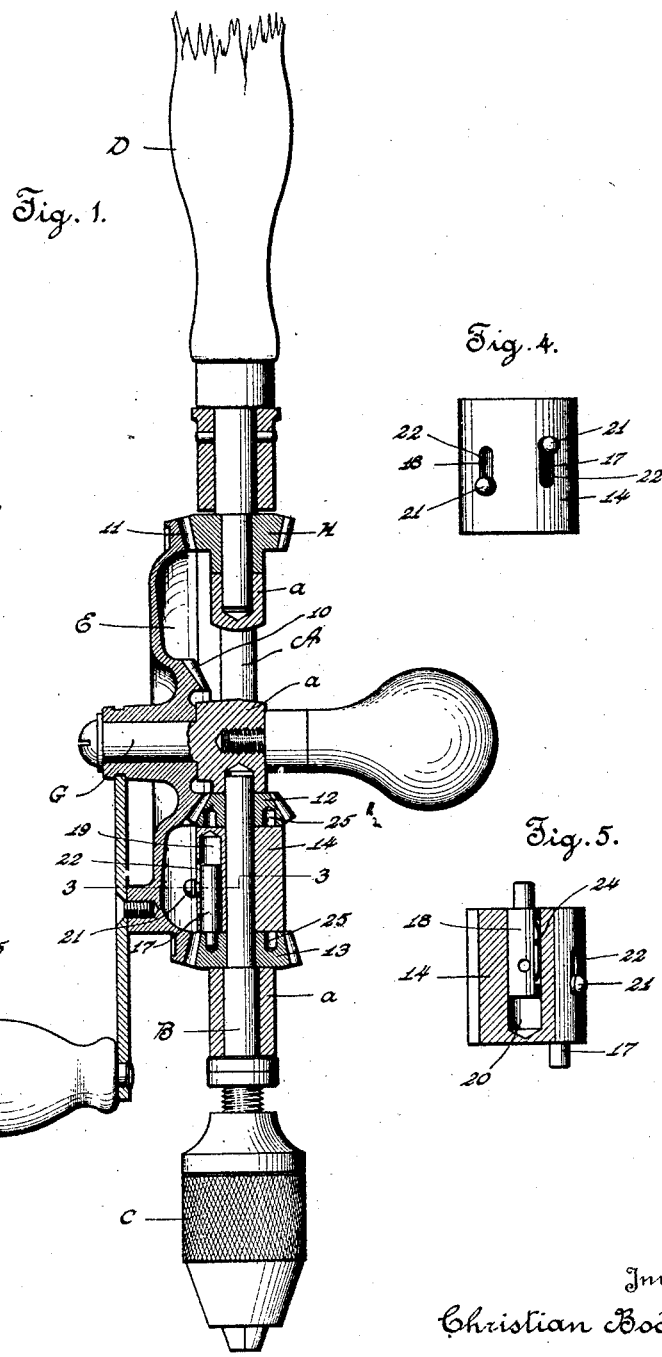

Patented May 5, 1925.

1,536,758

UNITED STATES PATENT OFFICE.

CHRISTIAN BODMER, OF NEW BRITAIN, CONNECTICUT, ASSIGNOR TO THE STANLEY WORKS, OF NEW BRITAIN, CONNECTICUT, A CORPORATION OF CONNECTICUT.

HAND DRILL OR THE LIKE.

Application filed September 13, 1923. Serial No. 662,443.

*To all whom it may concern:*

Be it known that I, CHRISTIAN BODMER, a citizen of the United States, and a resident of New Britain, county of Hartford, State of Connecticut, have invented certain new and useful Improvements in a Hand Drill or the like, of which the following is a specification.

The aim of the present invention is to provide a hand drill or the like with means, having features of novelty and advantage, for operatively connecting the drill spindle, for example, with the operating member or driving gear in such a manner that the spindle may be selectively driven at different speeds, the spindle and driving gear may be locked against relative movement, and the spindle may be rotated independently of the driving gear.

My improved construction is particularly characterized by its extreme simplicity and economy in construction and the ease and facility with which it may be operated to effect different speeds of the spindle or to lock the same against rotation.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings, wherein I have shown, for illustrative purposes only, one embodiment which the present invention may take;

Figure 1 is an elevational view in vertical section through the hand drill;

Fig. 2 is a view of one of the pinions associated with the drill spindle;

Fig. 3 is a partial sectional view taken substantially on line 3—3 of Fig. 1;

Fig. 4 is a side elevational view of the collar or sleeve which carries the means for selectively connecting the spindle to the several pinions; and Fig. 5 is a view similar to Fig. 4 with parts broken away to show the internal construction.

Referring to the drawings in detail, the drill has a frame A provided with cross pieces or bearings $a$ in which is journalled a drill spindle B carrying a chuck C for the drills or the like. Secured to the upper end of the frame in any suitable manner is a handle D. The spindle is driven by means of a driving gear E which may be provided with a handle F. In the present illustrative disclosure, this gear E is journalled on a stud G extending laterally from the central cross piece $a$ of the frame. For the purpose of steadying the gear E, there may be provided, if desired, an idler pinion H at the upper end of the frame.

In accordance with the present invention, I provide the gear E with two concentric rings of gear teeth 10 and 11 which respectively mesh with bevel pinions 12 and 13 mounted on the drill spindle B. Positioned between the pinions 12 and 13 is a collar or sleeve 14 secured to the spindle against rotary movement relative thereto in any suitable manner, as by means of a set screw 15. The pinion 12 is held between the central cross piece $a$ and the upper end of the collar 14 against axial movement and in constant meshing relation to the gear teeth 10. The other pinion 13 is held against axial movement and in constant meshing relation to the gear teeth 11 between the lower end of the collar or sleeve 14 and the bottom cross piece $a$. Carried by the sleeve 14 is means for independently connecting the pinions 12 and 13 against rotary movement relative to the sleeve 14 and the spindle B to which this sleeve is secured, as above described. This means, in the present illustrative disclosure, includes a pair of pins, one pin 17 being adapted to connect the pinion 13 to the sleeve, and the other pin 18 being adapted to connect the pinion 12 to the sleeve. These pins are mounted for sliding movement in suitable longitudinal bores 19 and 20, respectively, and are adapted to be operated or moved longitudinally by buttons 21 extending laterally through and beyond suitable slots 22 in the sides of the sleeve 14. For the purpose of holding the pins in any position of adjustment, and thus preventing their accidental engagement with or the inadvertent withdrawal from the respective gears 12 and 13, each of the pins carries a spring 24 bearing against the sleeve. The face of each gear 12 and 13 bearing against the sleeve 14 is provided with a concentric ring of recesses 25 in which the ends of the pins are adapted to be engaged. By providing a plurality of such recesses in each pinion, engagement of the respective pins in these recesses may be very quickly had.

The manner in which my improved hand drill operates will be readily understood from the foregoing description. In the event that a drill of larger size is to be employed, or a hole in a relatively hard piece of metal is to be formed, it is desirable to drive the chuck at a lesser speed and, in this instance, the pin 18 will be moved upwardly in the sleeve 14 so as to engage the pin in any one of the recesses of the pinion 12, thus fixing this pinion to the spindle B. The driving gear E is then rotated to drive the spindle at the desired speed through the gear teeth 10 and the pinion 12. During this operation, the pin 17 is disengaged from the pinion 13. In the event that a smaller drill is to be employed, or the material operated on is not so hard, the pin 18 is disengaged from the pinion 12, and the pin 17 is engaged with the pinion 13 so as to fix this latter pinion to the spindle, and then, when the driving gear E is rotated, the spindle is driven through the gear teeth 11 and the pinion 13 at a relatively faster speed. In some instances, it is desired to hold the spindle against rotation in the frame as, for example, when the chuck is to be turned to grip or release the drill. In such case, each of the pins 17 and 18 are engaged with respective gears 13 and 12 so as to lock both of these gears against rotation relative to the spindle. It will thus be obvious that, owing to the different pitch diameters of the gear teeth 10 and 11, rotation of the spindle cannot take place.

In other instances, it is desired to permit free rotation of the spindle without operation of the gear E and the pinions with which this gear is in mesh as, for example, when, during the drilling operation, the drill cuts through the work but the lower end of the hole has not been properly finished or cut out. In such a case, the drill jams, so to speak, and then it is of advantage to grip the chuck C and turn the same, together with the drill, while holding them against longitudinal movement. In such a case, with my improved construction, both of the pins 17 and 18 are withdrawn into the sleeve so as to disengage both gears 12 and 13 and then the spindle may be rotated directly by hand without turning the operating gears or pinions.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a hand drill a frame, a spindle journaled therein, and a speed changing device comprising a driving gear with two gear-sets, one within the other, a pair of pinions loose on said spindle and meshing with the respective gear-sets, a collar positioned between said pinions and permanently secured to said spindle, a pin slidably mounted in said collar and adapted to positively engage one of said pinions, and a second pin independent of the first one slidably mounted in said collar and adapted to engage the other of said pinions.

2. In a hand drill a frame, a spindle journaled therein, and a speed changing device comprising a driving gear with two gear-sets, one within the other, a pair of pinions loose on said spindle and meshing with the respective gear-sets, a collar positioned between said pinions and permanently secured to said spindle, a pin slidably mounted in said collar and adapted to positively engage one of said pinions, and a second pin independent of the first one slidably mounted in said collar and adapted to engage the other of said pinions, said pins being independently operable and arranged so that either, neither, or both, may be engaged with the respective pinions, said pins having means for moving the same.

3. In a hand drill, a frame, a spindle journaled therein, and a speed changing device including a pair of pinions freely mounted on said spindle and having in their opposed faces recesses, a driving gear having two gear sets, respectively meshing with said pinions, a collar carried by and secured to said spindle between said pinions and holding the same in spaced relation, a pin mounted in said collar for sliding movement and adapted to engage in the recesses in one of said pinions, and a second pin mounted in said collar independently of said first mentioned pin and adapted to engage in the recesses of the other pinion, and means frictionally engaging said pins for holding the same in advanced and retracted positions, respectively.

4. In a hand drill, a frame having a pair of spaced spindle bearings, a spindle in said bearings, a collar on said spindle having a pair of longitudinally extending bores, means for permanently fixing said collar to said spindle, a pair of pinions loose on said spindle and held in place thereon between said collar and the respective bearings, the opposed faces of said pinions being provided with recesses, a driving gear provided with two gear sets respectively meshing with said pinions, a pin mounted in each bore and adapted to respectively and positively engage in the recesses of the respective pinions, a button on each pin for moving the same into and out of engagement with the respective pinions, and a spring carried by each pin and engaging said collar, said pins being independently operable.

CHRISTIAN BODMER.